United States Patent
Veihelmann et al.

(10) Patent No.: US 10,184,197 B2
(45) Date of Patent: Jan. 22, 2019

(54) METHOD FOR PRODUCING FIBER PREFORMS FOR A COMPOSITE FIBER COMPONENT HAVING LOCALLY TAILORED MECHANICAL PROPERTIES

(71) Applicant: Bayerische Motoren Werke Aktiengesellschaft, Munich (DE)

(72) Inventors: Bernd Veihelmann, Landshut (DE); David Becherer, Munich (DE); Florian Rapp, Munich (DE); Thomas Miadowitz, Ergolding (DE)

(73) Assignee: Bayerische Motoren Weker Aktiengesellschaft, Munich (DE)

( * ) Notice: Subject to any disclaimer, the term of this patent is extended or adjusted under 35 U.S.C. 154(b) by 440 days.

(21) Appl. No.: 14/994,727

(22) Filed: Jan. 13, 2016

(65) Prior Publication Data

US 2016/0122917 A1    May 5, 2016

Related U.S. Application Data

(63) Continuation of application No. PCT/EP2014/067982, filed on Aug. 25, 2014.

(30) Foreign Application Priority Data

Sep. 9, 2013   (DE) .................. 10 2013 218 006

(51) Int. Cl.
*D04C 3/00*      (2006.01)
*D04C 1/06*      (2006.01)
(Continued)

(52) U.S. Cl.
CPC ............ *D04C 1/06* (2013.01); *B29B 11/16* (2013.01); *B29C 53/566* (2013.01); *B29C 53/8058* (2013.01); *D04C 3/00* (2013.01)

(58) Field of Classification Search
CPC ... D07B 1/18; D07B 7/14; D04C 1/06; D04C 3/00; D04C 9/02; D02G 3/324; D02G 3/362
See application file for complete search history.

(56) References Cited

U.S. PATENT DOCUMENTS

| 4,304,169 A | * | 12/1981 | Cimprich | ................. D04C 3/40 |
| | | | | 181/290 |
| 5,203,249 A | * | 4/1993 | Adams | ..................... D04C 3/48 |
| | | | | 87/34 |

(Continued)

FOREIGN PATENT DOCUMENTS

| CN | 1919587 A | 2/2007 |
| CN | 102770261 A | 11/2012 |

(Continued)

OTHER PUBLICATIONS

German-language European Office Action issued in counterpart European Application No. 14 761 296.4 dated Oct. 18, 2017 (four pages).

(Continued)

*Primary Examiner* — Tejash Patel
(74) *Attorney, Agent, or Firm* — Crowell & Moring LLP

(57) ABSTRACT

A method is provided for producing a fiber preform for a composite fiber component. In the method, at least one first fiber structure is braided in a braiding process over the entire length of the fiber preform to be produced and at least one second fiber structure is wound in a winding process over part of the length of the fiber preform to be produced.

13 Claims, 3 Drawing Sheets

(51) Int. Cl.
*B29B 11/16* (2006.01)
*B29C 53/56* (2006.01)
*B29C 53/80* (2006.01)

(56) References Cited

U.S. PATENT DOCUMENTS

| | | |
|---|---|---|
| 5,580,626 A | 12/1996 | Quigley et al. |
| 5,979,288 A | 11/1999 | Gallagher et al. |
| 2012/0279635 A1 | 11/2012 | Masson et al. |

FOREIGN PATENT DOCUMENTS

| | | |
|---|---|---|
| DE | 10 2008 052 671 B3 | 6/2010 |
| FR | 1 200 649 | 12/1959 |
| FR | 2 954 210 A1 | 6/2011 |
| WO | WO 90/15712 A1 | 12/1990 |
| WO | WO 95/30532 A1 | 11/1995 |

OTHER PUBLICATIONS

International Search Report (PCT/ISA/210) issued in counterpart International Application No. PCT/EP2014/067982 dated Jan. 28, 2015, with English translation (Six (6) pages).
Chinese Office Action issued in counterpart Chinese Application No. 201480034034.0 dated Jul. 28, 2016 with English translation (23 pages).
Chinese-language Office Action issued in counterpart Chinese Application No. 201480034034.0 dated Mar. 27, 2018 with English translation (sixteen (16) pages).
German-language European Office Action issued in counterpart European Application No. 14761296.4 dated Jun. 11, 2018 (four (4) pages).
Zhang, "High-Tech Composite Material Preparation Manual", May 2003, p. 238, Defense Industry Press.
Campbell, "Manufacturing Processes for Advanced Composites", Manufacturing Processes for Advanced Composites Elsevier Advanced Technology, Jan. 1, 2004, pp. 304-356, Oxford, GB, XP002580602.

* cited by examiner

METHOD FOR PRODUCING FIBER PREFORMS FOR A COMPOSITE FIBER COMPONENT HAVING LOCALLY TAILORED MECHANICAL PROPERTIES

CROSS REFERENCE TO RELATED APPLICATIONS

This application is a continuation of PCT International Application No. PCT/EP2014/067982, filed Aug. 25, 2014, which claims priority under 35 U.S.C. § 119 from German Patent Application No. 10 2013 218 006.3, filed Sep. 9, 2013, the entire disclosures of which are herein expressly incorporated by reference.

BACKGROUND AND SUMMARY OF THE INVENTION

The invention relates to a method for producing a fiber preform for a fiber composite component, in particular a hollow section, wherein a first fiber structure is braided in a braiding process and a second fiber structure is wound in a winding process.

There are known from the prior art braiding and plaiting processes for producing biaxial and triaxial braids for the production of fiber preforms using different types of fibers, in particular glass fibers, carbon fibers, aramid fibers as well as combinations thereof. The braiding process is particularly advantageous for forming the 0° orientation, that is to say the orientation along the longitudinal axis of the component to be manufactured, even in the case of complex component geometries, because slipping or misalignment of the fibers is reduced through the transverse bonding with braided fibers.

The winding of fibers to produce components is also known in principle from the prior art. However, the winding process is used mainly for rotationally symmetrical components with simple component geometries, because large angles relative to the 0° orientation, that is to say in particular in the circumferential direction, can very easily be achieved by winding, as compared with a braiding process. The 0° fiber orientation can scarcely be produced, or can be produced to only a very limited extent, by the winding process alone.

Braiding methods are likewise subject to limitations as regards variability because, especially in the case of triaxial structures, large angles relative to the 0° orientation can be achieved only with large cross-sections. In addition, the production rate falls considerably in the braiding process in the case of large angles. The fiber material which can be used is also limited by the reel size for the braiding threads and the undulation of the fibers. Fibers with a low thread fineness would have to be used, which increases the costs significantly, in particular when carbon fibers are used.

Against this background, the object of the invention is to provide a method with which there can be produced fiber preforms whose local mechanical properties can be adjusted via the production process.

This and other objects are achieved by a method for producing a fiber preform for a fiber composite component according to the invention, wherein at least a first fiber structure is braided in a braiding process over the entire length of the fiber preform that is to be produced, and at least a second fiber structure is wound in a winding process over a portion of the length of the fiber preform that is to be produced.

In an advantageous embodiment, the winding process and the braiding process take place simultaneously. The fiber preform forms the basis for the fiber composite component that is to be manufactured, wherein the further processing of the fiber preform takes place, for example, by the RTM method. The mechanical properties in the longitudinal direction, that is to say along the 0° orientation, is determined by the braided fiber structure, wherein the transverse mechanical properties can be determined in locally specific regions by the second, wound fiber structure. The component so produced can accordingly meet various requirements. The force absorption and transmission in the longitudinal direction along the 0° orientation is complemented by locally increased force absorption capacities in the transverse direction in the region of the wound fiber structure, for example in order to increase the crash stability of the component in the transverse direction. In order that the weight and the costs of the component are not increased excessively, it is provided according to the invention that the process of winding the second fiber structure does not begin until the first fiber structure has already been braided over a predetermined length in the braiding process, so that the fiber preform to be manufactured is provided with the wound fiber structure only in the region in which it is actually required, and the locally increased force absorption capacities in the transverse direction are achieved only in that region. This efficient use of the fiber material limits the material-related costs and reduces the weight of the fiber preform that is to be manufactured.

It is advantageously further provided that the winding process is integrated into the ongoing braiding process and terminated from the ongoing braiding process. To that end, the winding unit can be integrated into the braiding machine and can be so configured that the fibers can locally be applied to and removed from the fiber preform to be manufactured. The manufacturing installation advantageously has special pressure rollers for that purpose, with which the fiber structure to be wound is pressed onto the fiber preform until the friction between the fibers is sufficient that they fix themselves independently. In order to terminate the wound fiber structure, the fibers are cut with a cutting blade and attached to the fiber preform by the pressure rollers. To that end, it is provided in one embodiment of the invention that the fiber ends are fixed to the component to be manufactured by the action of heat and by a type of adhesive (e.g. spray adhesive, adhesive tapes, etc.). For example, the pressure rollers can be correspondingly heated for that purpose and equipped with a spray-adhesive device. Fixing accordingly takes place by the activation of binders previously introduced into the fibers. It is further possible to use the so-called fiber placement method.

The braiding process is not limited to a fiber orientation of 0°, it is also possible to braid fiber orientations of ±45°, wherein the winding process is additionally integrated with even larger angles. The fiber orientation of the wound fibers is in a range of from ±30 to ±80°, in particular from ±45 to ±80°. In an embodiment that is advantageous in terms of the production rate, the braided fibers are used for the 0° orientation and the wound fibers are used for a fiber orientation of from ±30 to ±80°. Positive and negative fiber angles are each adjusted through the direction of rotation of the winding.

The scope of protection of the present invention also includes the fiber preform for a fiber composite component having a first fiber structure extending over the entire length of the fiber preform and braided in a braiding process, and a second fiber structure extending over a portion of the length of the fiber preform and wound in a winding process. In an advantageous embodiment, the first fiber structure is triaxially braided and forms the 0° orientation. The wound fiber structure is arranged in a locally limited manner and has angles of from ±30 to ±80° relative to the 0° orientation.

Other objects, advantages and novel features of the present invention will become apparent from the following detailed description of one or more preferred embodiments when considered in conjunction with the accompanying drawings.

BRIEF DESCRIPTION OF THE DRAWINGS

The figures are schematic and by way of example. In all the views, the same reference numerals denote the same components.

DETAILED DESCRIPTION OF THE DRAWINGS

Figure 1:
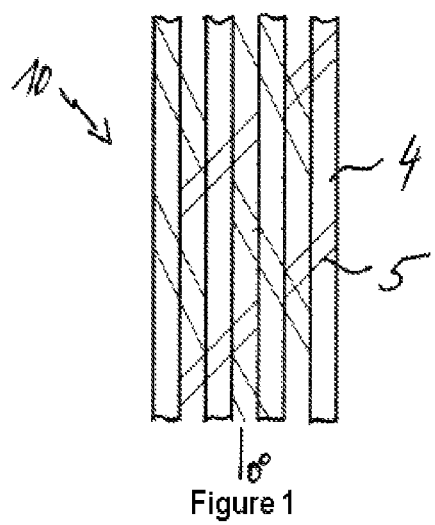
FIG. 1 is a plan view of a triaxial braided structure according to the prior art.

FIG. 1 shows the triaxially braided fiber structure 10 known from the prior art with thick carbon fibers 4 and thin braided fibers 5. The braided fibers 5 are braided at a predetermined angle around the carbon fibers 4. The braided fibers 5 serve to fix the carbon fibers 4.

Figure 2:
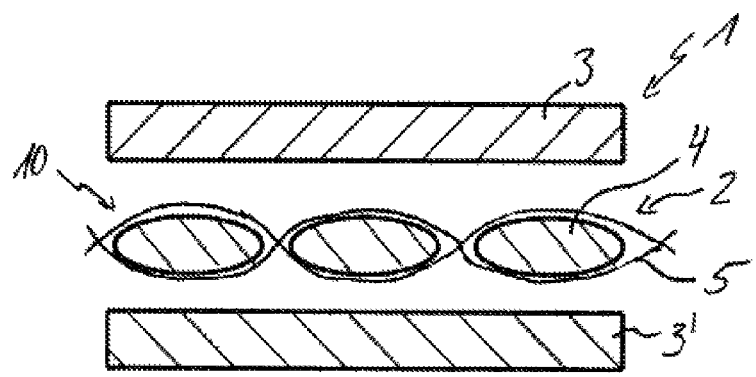
FIG. 2 is a cutaway view of a fiber preform having a braided and wound fiber structure in a first embodiment according to the invention.

FIG. 2 shows a cutaway view of a fiber preform 1 in a region in which a second fiber structure 11, formed of the wound fibers 3, 3', is arranged around the first fiber structure 10 of FIG. 1. In the embodiment shown, the wound fibers 3 have an orientation of −45° and the wound fibers 3' have an orientation of +45°. FIG. 2 shows a type of sandwich construction with a triaxial fiber structure 10 as the core and wound fibers 3, 3' surrounding the core.

Figure 3:
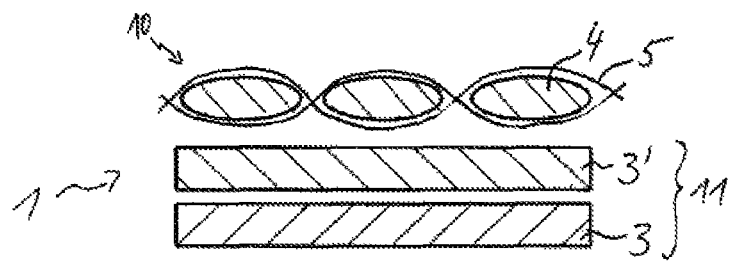
FIG. 3 is a cutaway view of a fiber preform having a braided and wound fiber structure in a second embodiment according to the invention.
Figure 4:
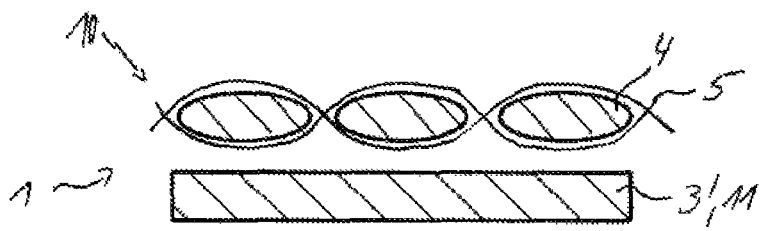
FIG. 4 is a cutaway view of a fiber preform having a braided and wound fiber structure in a third embodiment according to the invention.
Figure 5:
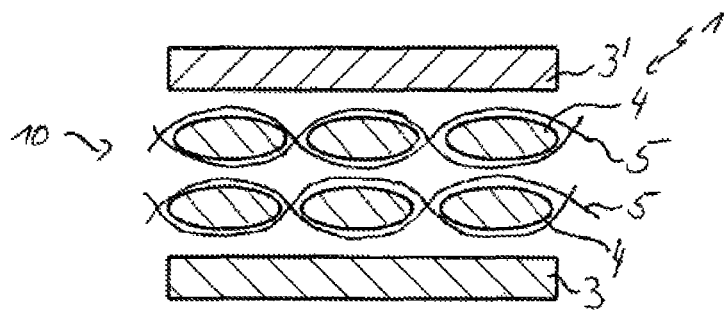
FIG. 5 is a cutaway view of a fiber preform having a braided and wound fiber structure in a fourth embodiment according to the invention.

FIGS. 3 to 5 show further possible embodiments, wherein in FIG. 3 the fiber preform 1 is arranged with two wound fiber structures 3, 3' on one side of the braided fiber structure 10. This can be achieved by manufacturing the fiber preform 1 to be manufactured first with the braided fiber structure 10 and the wound fibers 3', wherein an additional fiber ply is then added by the wound fibers 3. The braided fiber structure 10 forms the 0° orientation, the wound fiber structure 11 has fibers 3, 3' of −80° and +80°.

FIGS. 4 and 5 show further alternative embodiments for the arrangement of braided fiber structures 10 and wound fiber structures 11 in a two- and four-ply configuration. The features described in relation to FIGS. 2 and 3 apply correspondingly in this connection.

Figure 6:
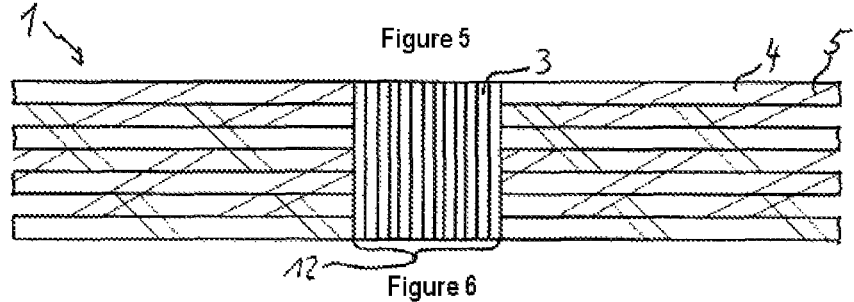
FIG. 6 is a plan view of a fiber preform according to an embodiment of the invention.

FIG. 6 shows a plan view of a finished fiber preform 1, in which the braided fiber structure 10 extends over the entire length and the second, wound fiber structure 11 is arranged in a locally limited manner in a region 12 in order to increase the transverse force absorption capacity of the fiber preform 1, or the fiber composite component to be manufactured therefrom, in that region 12.

Figure 7:
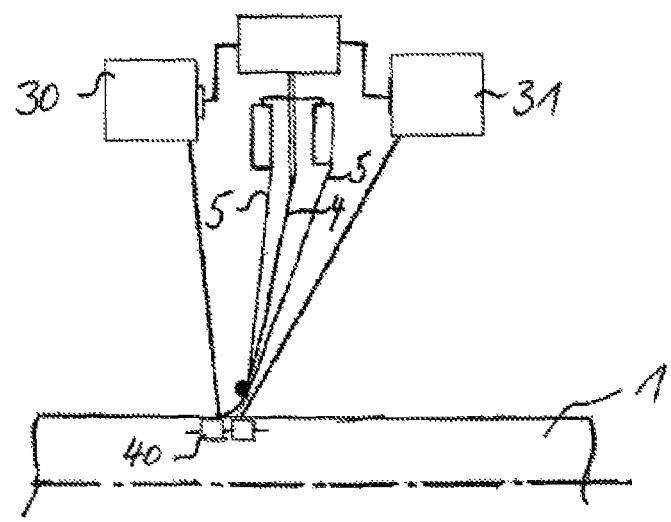
FIG. 7 is an installation for carrying out the method and producing the fiber preform.
Figure 8:
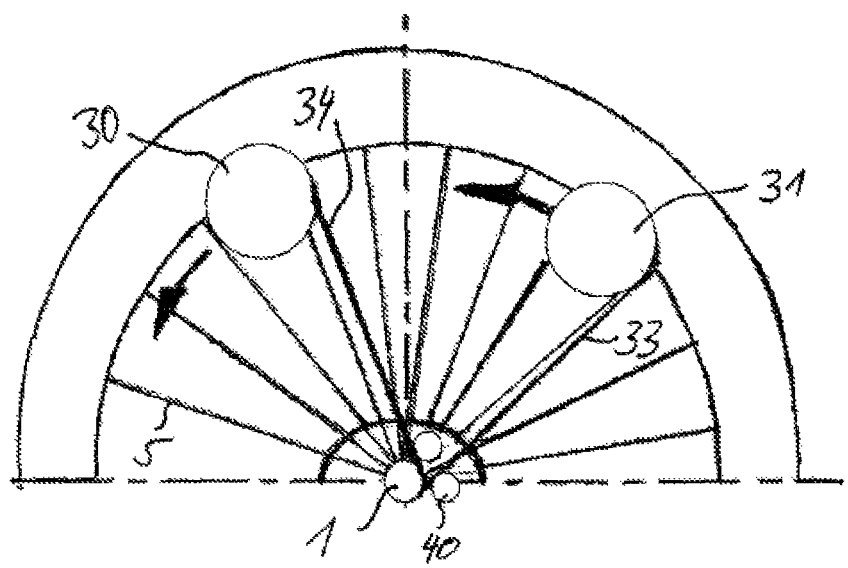
FIG. 8 is a side view of the installation of FIG. 7.

FIGS. 7 and 8 show a manufacturing installation with which there can be produced a fiber preform 1 having a braided fiber structure 10 and a locally limited wound fiber structure 11, which structures are produced simultaneously. The fiber preform 1 to be manufactured has a predetermined take-off speed, which influences the orientation of the braided fibers and of the wound fibers. In the installation shown, two winding systems 30 and 31 are provided in order to produce a wound fiber structure having a positive and a negative orientation. The braided fiber structures of carbon fibers 4 and braided fibers 5 extend over the entire length of the fiber preform 1. FIG. 7 shows the part of the method in which the second, wound fiber structure is additionally applied to the fiber preform 1. By means of pressure rollers 40, the fibers from the first and second winding system 30, 31 are pressed onto the fiber preform 1 as they are applied, until the fibers exhibit sufficient independent adhesion to the component. By means of the pressure rollers 40 or a further system (not shown), the fibers to be wound are subjected to the action of heat in order to ensure additional fixing to the fiber preform 1. This is the case both when the fibers are applied and when the wound fiber structure is later terminated or cut. In parallel with the process of braiding the first fiber structure 10 formed of carbon fibers 4 and braided fibers 5, fibers 33, 34 from the winding system 30, 31 are wound around the fiber preform 1 to be manufactured, whereby the fiber orientation of the wound fibers is determined by the speed of rotation of the winding systems 30, 31, which are preferably in the form of reels. The larger the angles of the fiber orientation are to be, the faster the winding systems 30, 31 must be guided around the fiber preform.

The invention is not limited in its execution to the preferred embodiments described above. Rather, a number of variants are conceivable which make use of the described solution even in the case of fundamentally different configurations. For example, different types of fibers, such as carbon fibers, aramid fibers or glass fibers, can be combined. In addition, the fibers can already be provided or impregnated with a binder beforehand. Also included are braids of tows supplemented with binder as the material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a fiber preform for a fiber composite component, the method comprising the acts of:
    braiding, in a braiding process, at least a first fiber structure over an entire length of the fiber preform to be produced; and
    winding, in a winding process, at least a second fiber structure over a portion of the length of the fiber preform to be produced;
    wherein the winding process begins after the first fiber structure has already been braided over a predetermined length in the braiding process.

2. The method according to claim 1, wherein
    the winding process is integrated into an ongoing braiding process and is terminated during the ongoing braiding process.

3. The method according to claim 1, further comprising the act of:

pressing, via pressure rollers, the wound second fiber structure onto the fiber preform to be produced.

4. The method according to claim 3, wherein the pressing occurs temporarily during the producing of the fiber preform.

5. The method according to claim 1, wherein the braiding process produces a fiber orientation of 0°.

6. The method according to claim 1, wherein the braiding process produces a fiber orientation of ±45°.

7. The method according to claim 1, wherein the winding process produces a fiber orientation of between ±30° and ±80°.

8. The method according to claim 5, wherein the winding process produces a fiber orientation of between ±30° and ±80°.

9. The method according to claim 6, wherein the winding process produces a fiber orientation of between ±30° and ±80°.

10. The method according to claim 1, wherein fibers of the first fiber structure are preimpregnated or supplemented with a binder material.

11. A fiber preform for a fiber composite component, comprising:

a first braided fiber structure extending over an entire length of the fiber preform; and a second wound fiber structure extending over a portion of the entire length of the fiber preform, wherein the second wound fiber structure is arranged only in a locally limited region on the first braided fiber structure and beyond a predetermined length of the first braided fiber structure.

12. The fiber preform according to claim 11, wherein the first braided fiber structure is a triaxially braided structure.

13. A fiber composite component, comprising:

a fiber preform of the fiber composite component, the fiber preform comprising:

a first braided fiber structure extending over an entire length of the fiber preform; and a second wound fiber structure extending over a portion of the entire length of the fiber preform, wherein the second wound fiber structure is arranged only in a locally limited region on the first braided fiber structure and beyond a predetermined length of the first braided fiber structure such that the fiber composite component has an increased transverse load absorption capacity in the region having the second wound fiber structure.

\* \* \* \* \*